United States Patent [19]

Nisida et al.

[11] 4,189,975
[45] Feb. 26, 1980

[54] SCREWED CONNECTION HAVING IMPROVED FATIGUE STRENGTH

[75] Inventors: Sinichi Nisida, Kitakyushu; Chikayuki Urashima, Nakama; Hiroki Masumoto, Kitakyushu, all of Japan

[73] Assignees: Nippon Steel Corporation, Tokyo; Nippon Steel Bolten Company Ltd., Fukuoka, both of Japan

[21] Appl. No.: 891,026

[22] Filed: Mar. 28, 1978

Related U.S. Application Data

[63] Continuation of Ser. No. 771,386, Feb. 23, 1977, abandoned.

[51] Int. Cl.$^2$ ............................................. F16B 33/00
[52] U.S. Cl. ....................................................... 85/1 T
[58] Field of Search ................. 85/1 T, 32 T, 46, 1 R; 151/14 R, 22

[56] References Cited

U.S. PATENT DOCUMENTS

| | | | |
|---|---|---|---|
| 2,267,923 | 12/1941 | Johnson | 85/46 X |
| 2,514,589 | 7/1950 | Penman | 85/46 |
| 2,587,544 | 2/1952 | Sneddon | 85/46 X |
| 2,772,102 | 11/1956 | Webb | 85/46 X |
| 3,245,142 | 4/1966 | Williams | 85/1 TX |
| 3,418,012 | 12/1968 | La Torre | 85/1 RX |

FOREIGN PATENT DOCUMENTS

| | | | |
|---|---|---|---|
| 843952 | 7/1952 | Fed. Rep. of Germany | 85/46 |
| 226987 | 8/1943 | Switzerland | 85/1 T |

*Primary Examiner*—Ramon S. Britts
*Attorney, Agent, or Firm*—Toren, McGeady and Stanger

[57] ABSTRACT

A screw-bolt having crest-cut-off threads with their heights progressively decreased to not more than $\frac{3}{4}$ times the basic height in the screwing up direction at a gradient ranging from 60/100 to 3/100 over that of the axial length of the threaded part of the bolt which is located between the unthreaded part and the complete thread upon setting up engagement with a nut therefor to allow a fraction of 0.1 to 0.2 unengaged with the nut, whereby the fatigue strength is increased in terms of the endurance limit from 6 kg/mm$^2$ for the prior art bolt and nut to more than 11 kg/mm$^2$ independently of whether SCM 14 or SNCM 5 steel is used in making the bolt and nut.

4 Claims, 11 Drawing Figures

A

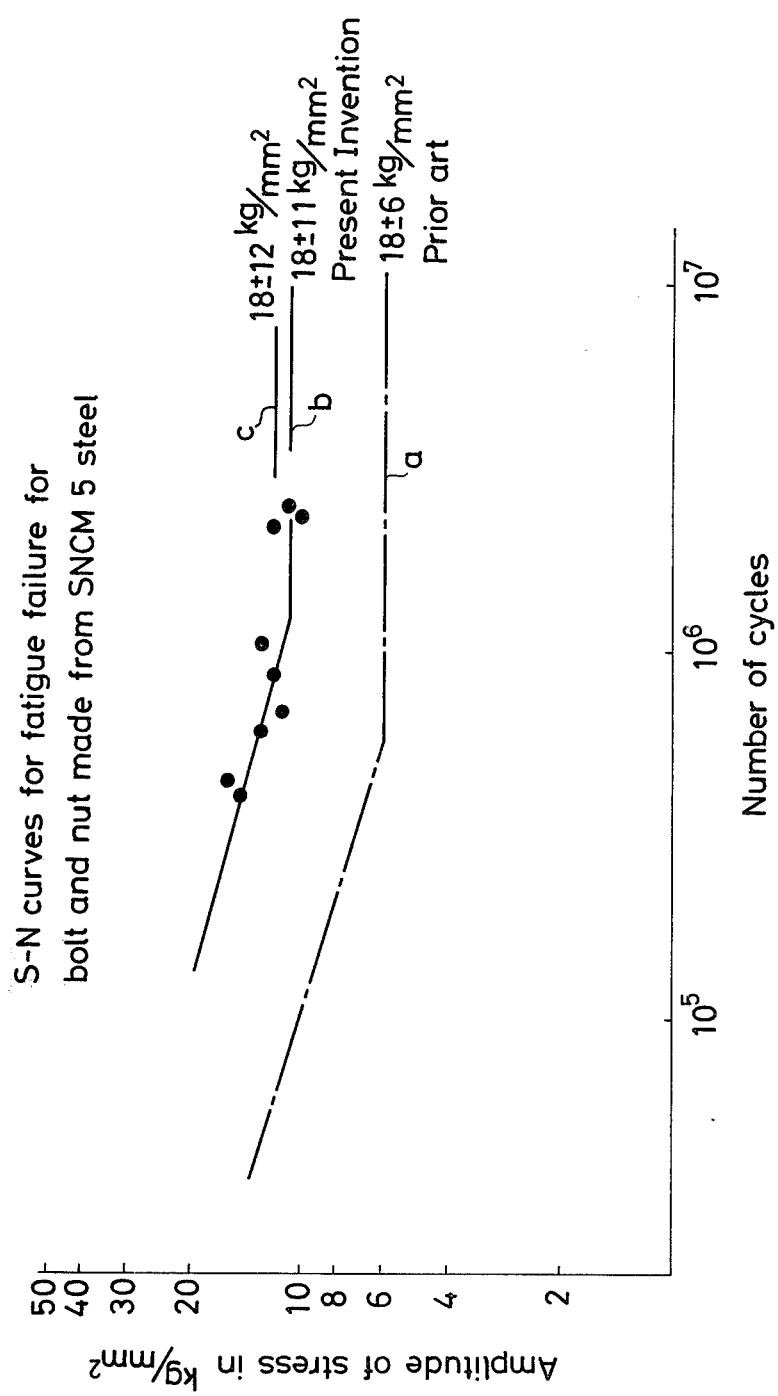

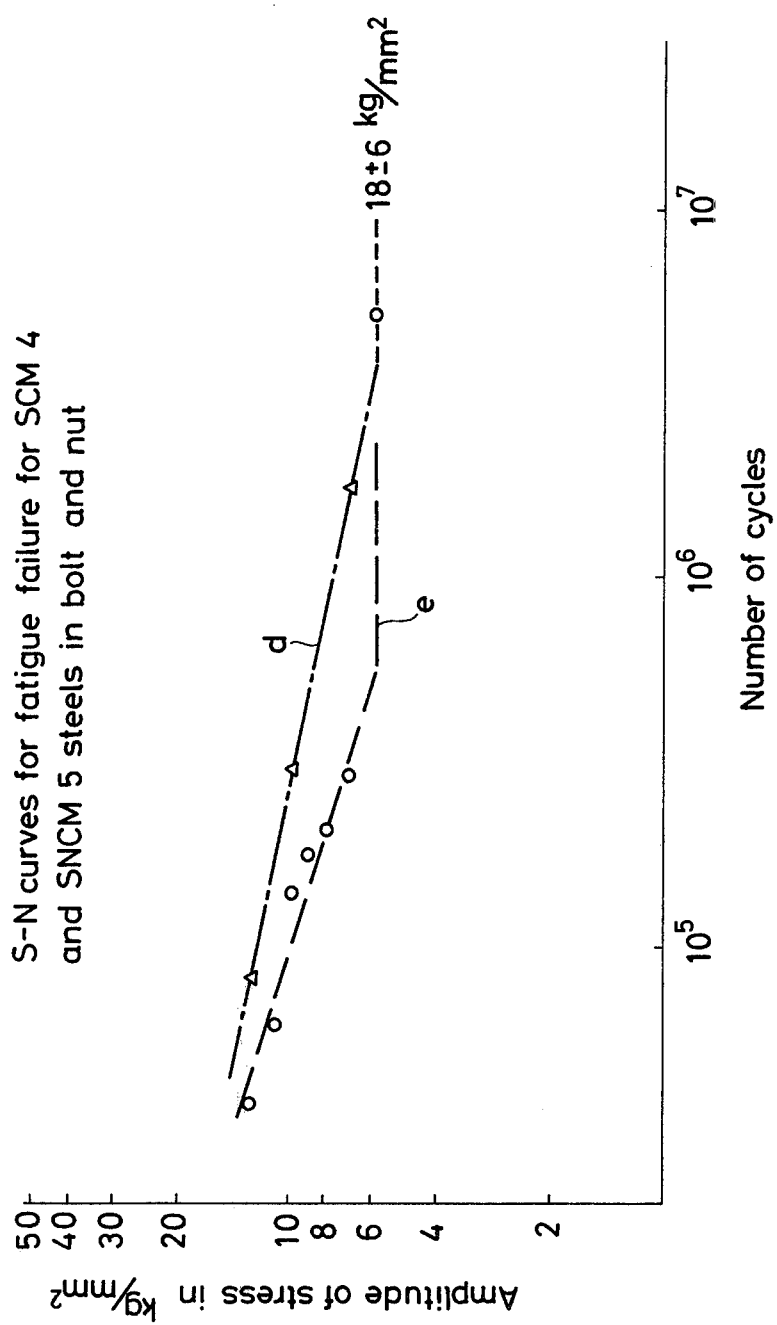

SCREWED CONNECTION HAVING IMPROVED FATIGUE STRENGTH

This is a continuation of application Ser. No. 771,386 filed Feb. 23, 1977, now abandoned.

This invention relates to screwed connections such as those generally employed in fastenings for constructional elements or machine parts, for example, bolt and nut and in jointings of pipes or the like, and more particularly to screwed connections specially modified in view of tensile stress distribution to increase fatigue strength.

The conventional screwed connections have, because of enabling constructional elements or machine parts to be assembled to or disassembled from each other far more easily and simply than those by means of welding, found their use in many fields of art, but are more liable to suffer from fatigue failure. On this account, attempts have been made to reduce the possibility of fatigue rupture, as, in the case of a screw-bolt 2 passing through an over-bored hole provided in a constructional element 1 into a mating nut 3 shown in FIG. 1(a), by increasing either or both of the included angle of thread and the nominal diameter of the bolt 2. Even when the engagement of thread between the bolt and nut with such modification is made perfect in the geometrical sense, however, it has been proven that the application of a tensile load (P) to the bolt in the screwing up direction indicated by arrow may result in a longitudinally varied tensile stress distribution over the successive screw-threads as rapidly concentrated toward the nut setting direction as shown in FIG. 1(b), thereby plastic deformation is allowed to occur beginning at the last one of the threads of the bolt and nut counting in the screwing down direction which are engaged with each other between the external and internal threads. Thus, it ultimately leads to the occurrence of fatigue rupture of the bolt and nut. For minimizing the possibility of such fatigue rupture, it is of importance to take into account the following factors. For example; (1) The tensile stress distribution is made as uniform as possible over the entire length of the engaging threads, as the satisfactory adjustment of driving torque for the screw-threaded fastening means at the setting up stage and the limited application of external force thereto are difficult to achieve. (2) As a large proportion of the applied tensile load is received by the leading flanks of the threads so that bending stress acts on the roots of the threads, when the root of the external thread is scratched by the crest of the internal thread, or the vice versa, there is a strong concentration of stress at the tip of such scratches. (3) It is very difficult to control the dimensions of the threads with so high accuracy that sufficiently uniform contact between the engaging surfaces of the external and internal threads is established over the entire area of the leading flank.

The present invention has for its general object to lessen the damaging effects due to the above mentioned factors to as large an extent as possible for the purpose of increasing fatigue strength.

According to the present invention, a screwed connection comprising an internal thread member and an external thread member is provided with a plurality of successive crest-cut-off threads designed to constitute at least a fraction of the effective threaded part of either of the internal and external members and having respective heights progressively decreased in the screwing up direction while maintaining constant either the major diameter of internal thread or the minor diameter of external thread respectively, as the crest truncation is correspondingly increased.

In one embodiment of the invention, the plurality of crest-cut-off threads with the special modification described are characterized in that the last thread counting in the screwing up direction must have a height equal to or smaller than $\frac{3}{4}$ times the height of basic configuration of the thread with no crest truncation, and that the gradient defined as $(H_n-H_1)/L$ must lie between 60/100 and 3/100 wherein $H_1$ and $H_n$ are the heights of the first and n-th or last threads and L is the sum of (n-1) axial pitches or the distance between the first and n-th threads inclusive and wherein it is assumed that the height $H_n$ of n-th thread is a linear function of an integer n as a variable.

In another specific embodiment of the invention, the plurality of crest-cut-off threads of the character described are formed to occupy at least a portion (hereinafter called a tapered portion) of the effective threaded part of the external thread member such that upon setting up engagement with the internal thread member the following condition is satisfied:

$$0.1L < l < 0.9L$$

wherein $l$ is the length of the tapered portion, which remains unengaged with the threaded part of the mating internal thread member, as shown in FIG. 3.

Where the diameter of the unthreaded part of the external thread member is larger than the minor diameter of the external thread, the external bottom contiguous the leading flank of the last crest-cut-off thread is cleared up to the unthreaded part in a moderate curve in order to avoid an unduly large concentration of tensile stress at a separation between the threaded and unthreaded parts of the external thread member. A great advantage of the present invention can be realized particularly when the principles of the invention are applied to the field of screwed connections using triangle threads in basic profile.

Another object of the invention is to provide a method of producing an external thread member having an improved fatigue strength which method comprises the steps of reshaping a workpiece having a uniform external diameter over that part of the axial length thereof on which a screw-thread is to be formed to a preconfiguration of continuously decreasing diameters over at least a fraction of that part in the setting direction and then cutting the screw-thread on the preconfigured workpiece over the entire length of that part while maintaining constant the root diameter throughout.

These and other objects, features and advantages of the invention will become apparent from the following detailed description taken in conjunction with the accompanying drawings in which:

FIG. 9 is a graph in maximum amplitude of stress versus number of cycles to fatigue failure for the bolt and nut of FIG. 4 according to the invention compared with the prior art bolt and nut of FIG. 1.

FIG. 10 is a similar graph showing no dependence on the fatigue strength of which type of steel is selected for employment in making the prior art bolt and nut of FIG. 1.

Figure 11A:
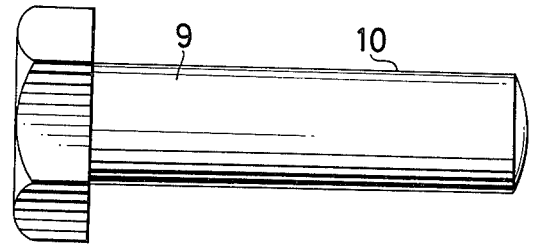
Figure 11B:
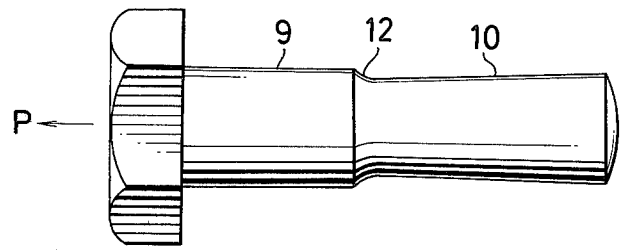
Figure 11C:
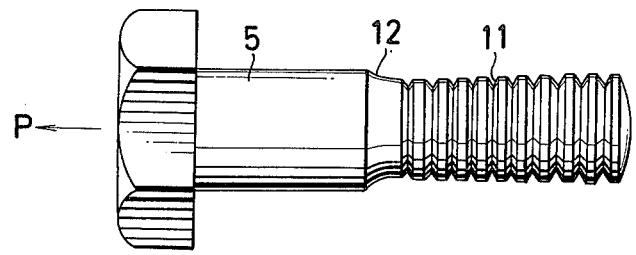

FIGS. 11(a), 11(b) and 11(c) shows an example of the process for producing a screw-bolt according to the present invention with three bolts being sampled from the respective distinct steps of the process.

Figure 2:
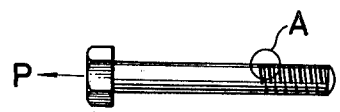
FIG. 2 is an elevational view of a screw-bolt considered to define the direction in which a tensile load is applied.
Figure 3:
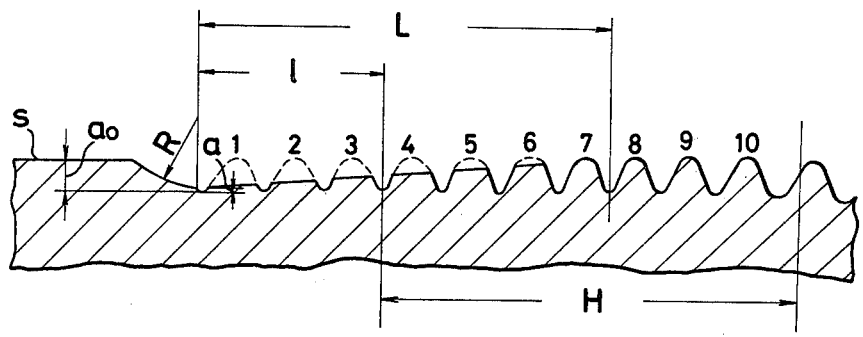
FIG. 3 is a fragmentary sectional view of one embodiment of a screw-bolt according to the present invention in a portion corresponding to that marked by A in FIG. 2 and wherein the definition of the various design parameters characteristic of the present invention is given.

Referring now to FIGS. 2 and 3, there is shown one embodiment of the present invention as applied to a screw-bolt having a threaded part formed at one end portion thereof, the opposite end of which carries a head. When this screw-bolt is to be used in fastening a constructional element or elements against the bolt head by setting up a not shown nut therefor, a tensile force is exerted in the screw-up direction indicated by an arrow in FIG. 2. Thus in the present invention, the term "screw-up direction" when used in respect to the external thread member means the direction the internal thread member is displaced during tightening the screwed connection, and the term when used in respect to the internal thread member means the direction in which the external thread member is displaced during tightening the screwed connection. In order to achieve a remarkable increase in fatigue strength for such an assembly of the bolt and nut, according to the present invention, the bolt is provided with a plurality of threads, in FIG. 3 for instance, seven crest-cut-off threads with their respective heights progressively decreased in the screwing up direction to a value, a, is specified as:

$$0 \leq a \leq \frac{3}{4} a_0$$

wherein $a_0$ is the height of the complete thread, while the root diameters of these specially crest-cut-off threads is designated by numerals 1 to 7 respectively counting in the screwing up direction are made equal to one another and to those of the threads of complete or basic form designated by respective numerals 8, 9, 10 and so on, as the magnitude of crest truncation of the modified threads 1 to 7 is correspondingly decreased. A concomitant specific requirement is that the overall gradient defined as $(a_n-a_l)/L$ must lie between 60/100 and 3/100, wherein $a_l$ and $a_n$ are the heights of the first and n-th or last threads counting in the screwing up direction and L is the distance from the first to the last thread. It is preferred that the height of any modified thread is a linear function of the distance of that thread measured from the first thread, but the generating line to which the sequence of all the modified threads are tangent at their crests may be curved to such a degree that any partial gradient for the sequence of the k-th through n-th threads approximated as $(a_m-a_k)/(d_m-d_k)$ falls in the above-specified range, wherein $d_k$ and $d_m$ are the distances from the first thread to the k-th and m-th threads respectively.

In order to assure the efficacy of the specially modified threads of this invention in improving the fatigue strength of the assembly of the bolt using the same and the nut therefor, it is of importance to require that the position of the crest-cut-off threads relative to the nut-engaging threads is adjusted in accordance with the following inequality:

$$0.1L < l < 0.9L$$

wherein $l$ is the axial length of the tapered portion, which remains unengaged with the threaded part H of the mating nut. In the instance of FIG. 3, this unengaged portion includes threads designated 1 to 3.

As a large proportion of the tensile stress tends to be concentrated at the root of the thread 1 contiguous the unthreaded part of the external thread member or bolt, it is preferred that the root is cleared up to the diameter of the unthreaded part in a moderate curvature as exemplified in FIG. 3. When the diameter of the unthreaded part is equal to or smaller than the minor diameter of external thread, it is of course unnecessary to provide such a clearance between the threaded and unthreaded parts. Preferably, as shown in FIGS. 3, the diameter of the moderately curved portion is at least the same as or greater than the diameter of the thread root of the threaded part. This feature is also illustrated in FIG. 11(c).

Figure 1A:
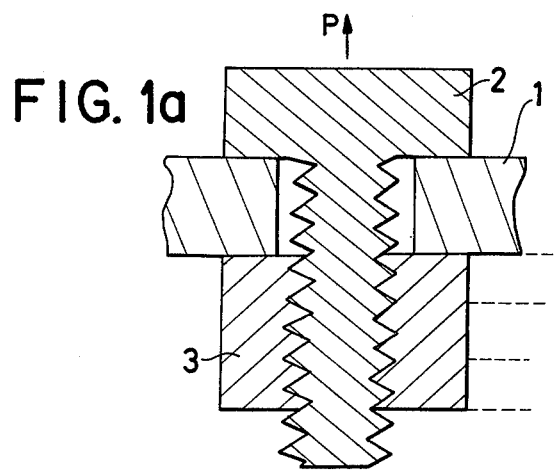
FIG. 1(a) is a sectional view of a conventional bolt and nut shown as fastening a constructional element.
Figure 1B:
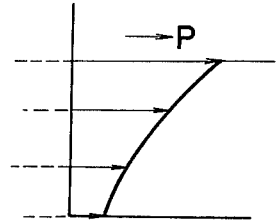
FIG. 1(b) is a graph showing occurrence of an uneven tensile stress distribution over the thread-engaging surface between the bolt and nut of FIG. 1(a).
Figure 4:
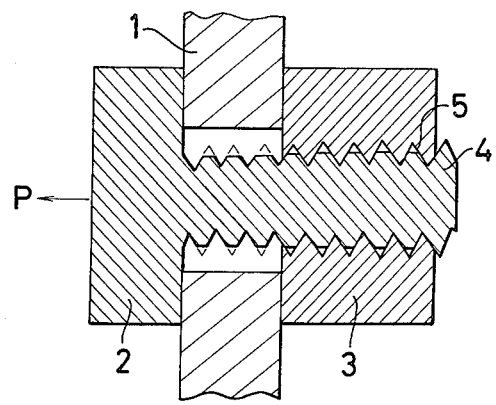
FIG. 4 is a sectional view of a bolt and nut embodying one form of the present invention as applied to the bolt and nut of FIG. 1(a), these bolt and nut assemblies being used in the fatigue test.

The following fatigue test is used to demonstrate the efficacy of the threads of the character described of the invention as employed in a screwed connection. The results of such test indicate clearly the high technical level of the invention for the design of basic form of thread in achieving a remarkable improvement of the fatigue strength of the screwed connection. As a test specimen, use was made of a bolt and nut of FIG. 4, wherein the bolt 2 having a diameter of 25 mm and using triangle threads in basic profile some of which are modified according to the invention is shown as assembled at its externally threaded part 4 with the internally threaded part 5 of the nut 3 to fasten a constructional element 1 with a mean tensile stress of 18 kg/mm$^2$. The bolt and nut of FIG. 1 of the same dimensions as the above was also used as a control test specimen. The materials from which these test specimens were made up were SCM 4 and SNCM 5 steels having the chemical compositions and mechanical properties given in Tables 1 and 2 below.

Table 1

| Steel | Sampled zone | Chemical Composition of Steels | | | | | | | |
|---|---|---|---|---|---|---|---|---|---|
| | | C | Si | Mn | P | S | Ni | Cr | Mo |
| | Surface[*1] | 0.41 | 0.35 | 0.73 | 0.013 | 0.020 | 0.08 | 1.02 | 0.21 |

Table 1-continued

| Steel | Sampled zone | Chemical Composition of Steels | | | | | | | |
|---|---|---|---|---|---|---|---|---|---|
| | | C | Si | Mn | P | S | Ni | Cr | Mo |
| SCM4 | Inter-mediate[*1] | " | 0.36 | 0.75 | 0.014 | 0.031 | " | 1.05 | 0.22 |
| | core[*1] | 0.44 | 0.36 | 0.78 | 0.015 | 0.033 | " | 1.06 | 0.23 |
| Standard | | 0.44 | 0.35 | 0.90 | <0.030 | <0.030 | — | 1.25 | 0.35 |
| | rh.1[*2] | 0.29 | 0.25 | 0.44 | 0.009 | 0.006 | 2.97 | 2.98 | 0.59 |
| | rh.1'[*2] | " | " | " | " | " | " | " | " |
| SNCM5 | rh.2[*2] | 0.32 | 0.27 | 0.45 | 0.012 | 0.007 | 3.00 | 2.99 | 0.61 |
| | rh.2'[*2] | " | " | " | " | " | " | " | " |
| Standard | | 0.25/ 0.35 | 0.15/ 0.35 | 0.35/ 0.60 | <0.030 | <0.030 | 2.50/ 3.50 | 2.50/ 3.50 | 0.50/ 0.70 |

[*1]: Specimen, Analysis
[*2]: Ladle Analysis

Table 2

| Steel | Sampled zone | Mechanical Properties of Steels | | | | | |
|---|---|---|---|---|---|---|---|
| | | P.S. (kg/mm$^2$) | T.S. (kg/mm$^2$) | El. (%) | R.A. (%) | Impact value(kg-m/cm$^2$) | |
| | | | | | | vE 20° C. | uE 20° C. |
| SCM 4 | Surface | 59.4 | 80.7 | 21.0 | — | 2.7 | — |
| | Inter-mediate | 37.7 | 77.2 | 22.0 | — | 2.0 | — |
| | Core | 60.4 | 82.7 | 22.0 | — | 1.9 | — |
| Standard | | >85.0 | >100.0 | >12.0 | >45.0 | — | >6.0 |
| | rh. 1 | 91.0 | 103.0 | 22.0 | 64.4 | — | 10.3 |
| SNCM 5 | rh.1' | " | 101.7 | 23.0 | 63.1 | — | 11.2 |
| | rh.2 | 89.0 | 100.4 | 23.0 | 60.5 | — | 5.5 |
| | rh.2' | 87.7 | 100.0 | 22.0 | 60.5 | — | 5.4 |
| Standard | | >90.0 | >110.0 | >15.0 | >45.0 | — | >8.0 |

Using an Amsler type pulsating stress fatigue machine of 50 ton capacity, the test specimens each were cycled at a speed of 500 c.p.m. for application of tensile stress between the bolt and nut with a mean tensile stress of 18 kg/mm$^2$. The data were plotted as the maximum amplitude of stress versus the logarithm of the number of cycles to failure in FIGS. 9 and 10. It will be appreciated from FIG. 9 that whilst the conventional bolt and nut of FIG. 1 has an endurance limit of 6 kg/mm$^2$ as indicated by a curve, a, the bolt and nut of the present invention has an endurance limit of 11 kg/mm$^2$ as indicated by a curve, b. In view of the maximum amplitude of stress, therefore, it follows that the fatigue strength of the bolt and nut of the invention is made twice as large as that of the conventional one. Another S-N curve designated by c is obtained from such a test that the specimen of the invention before subjected to the fatigue machine was passed through a state of steady tensile stress of 32 kg/mm$^2$ at which plastic deformation took place in the roots of the threads of the bolt. In this case, the fatigue strength is further increased (12 kg/mm$^2$).

In making up the conventional bolt and nut, two different types of steel materials were used to obtain S-N curves, d, and, e, in FIG. 10 for SCM 4 and SNCM 5 respectively. It is to be understood from FIG. 10 that the fatigue strength of the conventional bolt and nut can not be increased to an appreciable extent by use of an alternative material having higher mechanical properties. On the basis of these facts, the technical level of the design features of the present invention for screwed connections may be said to be far higher than the heretofore attained level.

The utility of the specially modified threads of the invention certified by the fatigue test in connection with a triangular thread of basic form is also true for other basic forms of threads such as square threads and round threads. An advantage of the invention is that the conventional design features may be employed for the basic form of thread except for that portion of the threaded part which appears as if it were a cone pointing to the tightening direction, and that even in this portion no particularly complicated basic form of thread is required. Another advantage deriving from the increased crest clearances is that the corrosion resistance of the screwed connection can be preserved by applying a grease having rust-proof and lubricant effect into such clearances or by forming a metal coating such as Zn thereon, and likewise defects can be prevented by the provision of suitable means therein.

Figure 5:
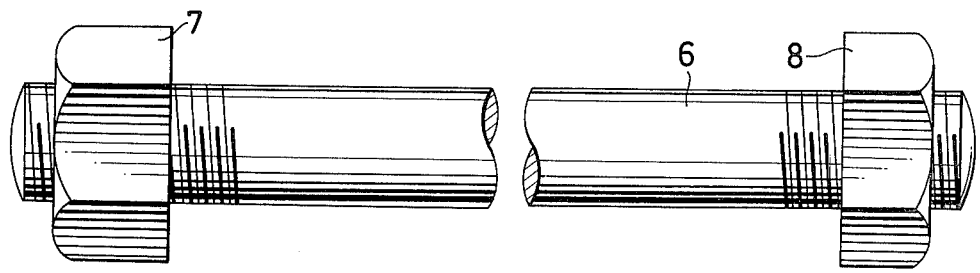
FIG. 5 and FIG. 6 are elevational views of a double-end screw-stud employing the principles of the invention.
Figure 6:
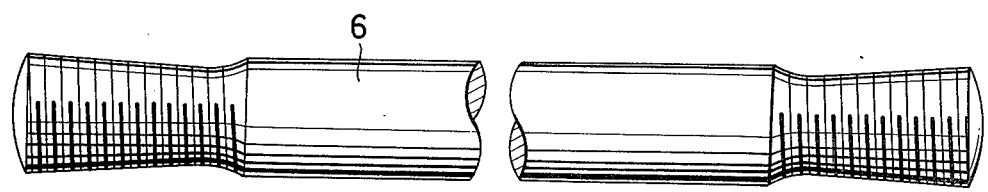

The above described embodiment of the present invention is directed to the type of screwed connection having a threaded part formed at only one end portion thereof, but the present invention is applicable to the double-end type screwed connection as shown in FIGS. 5 and 6. In FIGS. 5 and 6, a stud 6 having two threaded parts formed at either end thereof for engagement with respective nuts 7 and 8. In the case of a usual double-end screw-stud, the external force is applied to the stud through the nuts 7 and 8, so that the direction of tensile force or the screw up direction with respect to the nut 7 is one from the nut 7 to the nut 8 as the external thread member (stud) is caused to move in the above-identified direction when the nut 7 is taken out of engagement with the stud while permitting the maintenance of the external force applied thereon. Conversely, with respect to the nut 8, the direction of tensile force is from the nut 8 to the nut 7.

The present invention is applicable to a wide variety of fields including not only general fastening means such as bolt and nut but also the threaded parts of crane hooks, machine parts and pipe jointings. It is most preferable to apply to the place where cyclic stress is effected as in the fastened parts of machine elements, but it is of course possible to apply to the case where the stress concentration constitutes one reason for causing failure as in ductile fracture and delayed fracture.

Figure 7:
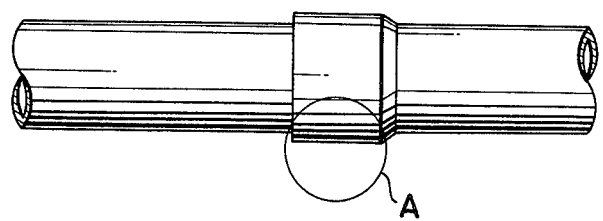
FIG. 7 is a fragmentary elevational view of a pipe line at a screw-jointing.
Figure 8:
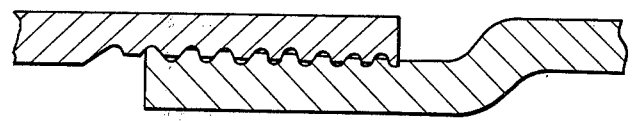
FIG. 8 is a longitudinal sectional view of the screw-jointing of FIG. 7 employing the principles of the invention.

In FIG. 7, there is shown a pipe jointing employing one form of the present invention. FIG. 8 shows the details of a section A of FIG. 7 wherein not only the external thread member but also the internal thread member is provided with the plurality of crest-cut-off threads of decreasing heights in the screwing up direction according to the invention. In FIGS. 7 and 8, the arrow mark indicates the direction of tensile force or the screw up direction. In this case, it is not necessary to use the specially crest-cut-off threads in both of the members.

Next, the method of producing a screwed connection of the present invention will be explained. In the case of the screwed connection shown in FIG. 4, a finished screw-bolt of the conventional structure may be used as a starting workpiece for production of the screw-bolt of the invention. This method is preferable from the standpoint of dimensional control with high accuracy, but can not be said to be highly efficient in production run because of a relatively long length to be modified in accordance with the invention. Accordingly, a plan for the mass production of such screw-bolts is ultimately to be limited. In order to overcome such a problem, it is preferable to deform a workpiece before cutting a screw-thread at a portion on which the specially modified threads of the invention are to be formed, and then to cut the screw-thread while maintaining constant the minor diameter of thread.

An example of the process for performing the latter method is shown in FIG. 11. As shown in FIG. 11(a), a bolt 9 having no threaded part 10 is first supplied. This bolt 9 is then shaped to a cone pointing in the direction of tensile force P at the part 10 on which screw thread 11 is to be cut. The thus shaped bolt of FIG. 11(b) is subjected to thread-cutting while maintaining constant the minor diameter of thread throughout the entire area of the part 10 whereby a screw-bolt of the invention is produced as shown in FIG. 11(c). A clearance of moderate curvature 12 is provided between the threaded and unthreaded parts 10 and 5 respectively.

What is claimed is:

1. A screwed connection comprising an internal thread member and an external thread member, said external thread member having an axially extending threaded part and a cylindrically shaped unthreaded part having an outside diameter at least equal to the maximum diameter of said threaded part and extending axially from one end of said threaded part, the threaded part of said external thread member being provided with at least one complete thread and a plurality of successive crest-cut-off threads arranged to constitute at least a fraction of the threaded part thereof and having heights of said crest-cut-off threads progressively decreasing from said at least one complete thread in the screwing up direction of said connection to the unthreaded part thereof while maintaining constant the major diameter of the internal thread and the minor diameter of the external thread respectively, the crest-cut-off thread having the least height being located adjacent to the unthreaded part, and an axially extending clearance section of moderate concave curvature extending between the radially outer surface of said crest-cut-off thread having the least height and said unthreaded part and the least diameter of said axially extending clearance section being at least equal to the diameter of the thread root of said axially extending threaded part.

2. A screwed connection according to claim 1, wherein a generating line in the axial plane to which the sequence of all the crest-cut-off threads of progressively decreasing heights are tangent at their cut off crests is made linear and satisfies the following requirements:

$$0 \leq a_n \leq \frac{3}{4} a_0 \qquad (a)$$

$$\frac{60}{100} [<] \geq \frac{(a_n - a_1)}{L} [<] \geq \frac{3}{100} \qquad (b)$$

wherein $a_0$ is the height of a thread of basic form, $a_1$ and $a_n$ are the heights of the first and n-th or last threads counting in the screwing up direction in said plurality of crest-cut-off threads of progressively decreasing heights, and L is the distance from the first to the last thread.

3. A screwed connection according to claim 1, wherein said plurality of crest-cut-off threads of progressively decreasing heights in said external thread member occupy at least a portion of the effective threaded part thereof such that upon setting up engagement with said internal thread member the following condition is satisfied:

$$0.1L < l < 0.9L$$

wherein l is the axial length of a tapered portion, which remains unengaged with the threaded part of said mating material thread member.

4. A screwed connection according to claim 1, wherein the basic form of thread in the axial section is triangular.

* * * * *